(12) United States Patent
Kojima et al.

(10) Patent No.: US 11,005,119 B2
(45) Date of Patent: May 11, 2021

(54) ELECTROLYTE MEMBRANE FOR FUEL CELL, MANUFACTURING METHOD OF ELECTROLYTE MEMBRANE, MEMBRANE ELECTRODE ASSEMBLY, AND FUEL CELL

(71) Applicant: Panasonic Intellectual Property Management Co., Ltd., Osaka (JP)

(72) Inventors: Toshiyuki Kojima, Kyoto (JP); Masahiro Mori, Osaka (JP); Shinya Kikuzumi, Osaka (JP); Yasuhiro Ueyama, Hyogo (JP); Yasushi Taniguchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 760 days.

(21) Appl. No.: 14/432,264

(22) PCT Filed: Jun. 30, 2014

(86) PCT No.: PCT/JP2014/003470
§ 371 (c)(1),
(2) Date: Mar. 30, 2015

(87) PCT Pub. No.: WO2015/059848
PCT Pub. Date: Apr. 30, 2015

(65) Prior Publication Data
US 2016/0028100 A1    Jan. 28, 2016

(30) Foreign Application Priority Data

Oct. 25, 2013    (JP) .............................. JP2013-222341

(51) Int. Cl.
*H01M 8/10*    (2016.01)
*H01M 8/1058*    (2016.01)
(Continued)

(52) U.S. Cl.
CPC ....... *H01M 8/1058* (2013.01); *H01M 8/1004* (2013.01); *H01M 8/106* (2013.01);
(Continued)

(58) Field of Classification Search
None
See application file for complete search history.

(56) References Cited

U.S. PATENT DOCUMENTS 5,795,668 A * 8/1998 Banerjee ............. H01M 8/0291
429/492
2001/0038949 A1* 11/2001 Hatazaki ........... H01M 10/0567
429/324

(Continued)

FOREIGN PATENT DOCUMENTS

JP    2006-252967    9/2006
JP    2009-16074    1/2009

(Continued)

OTHER PUBLICATIONS

Written Opinion of the International Searching Authority dated Sep. 22, 2015 in International (PCT) Application No. PCT/JP2014/003470 with English translation.

(Continued)

*Primary Examiner* — Zhongqing Wei
(74) *Attorney, Agent, or Firm* — Wenderoth, Lind & Ponack, L.L.P.

(57) ABSTRACT

In an electrolyte membrane for a fuel cell, having nanofiber unwoven cloth buried in an electrolyte resin, the nanofiber unwoven cloth is disposed being exposed only from one face of the electrolyte membrane. The fuel cell includes a MEA having an anode electrode disposed on one face of the electrolyte membrane and having a cathode electrode disposed on the other face thereof, and a pair of separators holding the MEA by sandwiching the MEA therebetween.

(Continued)

Thereby, the electrolyte membrane for a fuel cell, the manufacturing method of the electrolyte membrane, and the fuel cell are provided with which the electric power generation property and productivity are improved.

11 Claims, 6 Drawing Sheets

(51) Int. Cl.
*H01M 8/1062* (2016.01)
*H01M 8/106* (2016.01)
*H01M 8/1039* (2016.01)
*H01M 8/1023* (2016.01)
*H01M 8/1004* (2016.01)
*H01M 8/1018* (2016.01)

(52) U.S. Cl.
CPC ....... *H01M 8/1023* (2013.01); *H01M 8/1039* (2013.01); *H01M 8/1062* (2013.01); *H01M 2008/1095* (2013.01); *H01M 2250/20* (2013.01); *H01M 2300/0082* (2013.01); *Y02E 60/50* (2013.01); *Y02P 70/50* (2015.11); *Y02T 90/40* (2013.01)

(56) References Cited

U.S. PATENT DOCUMENTS

| | | | |
|---|---|---|---|
| 2010/0196787 A1* | 8/2010 | Inoue | H01M 8/04119 429/483 |
| 2013/0101918 A1 | 4/2013 | Yandrasits et al. | |
| 2013/0130133 A1 | 5/2013 | Jiang et al. | |
| 2014/0242477 A1 | 8/2014 | Kikuzumi et al. | |

FOREIGN PATENT DOCUMENTS

| | | | |
|---|---|---|---|
| JP | 2009-070675 | 4/2009 | |
| JP | 2011-146256 | 7/2011 | |
| JP | 2011-216269 | 10/2011 | |
| WO | 2008/032597 | 3/2008 | |
| WO | WO 2012099582 A1 * | 7/2012 | ................ C08J 5/22 |
| WO | 2013/051189 | 4/2013 | |
| WO | 2014/006817 | 1/2014 | |
| WO | 2015-059848 | 4/2015 | |

OTHER PUBLICATIONS

International Search Report dated Aug. 5, 2014 in International (PCT) Application No. PCT/JP2014/003470 (in Japanese language).
Japanese Office Action of the corresponding JP application No. 2014-543707 dated Dec. 2, 2014 with a verified English translation.
Japanese Decision to Grant a Patent of the corresponding JP application No. 2014-543707 dated Mar. 3, 2015.
English translation of International Search Report dated Aug. 5, 2014 in International (PCT) Application No. PCT/JP2014/003470.
Extended European Search Report dated Feb. 4, 2016 in corresponding European Patent Application No. 14855990.9.
Chinese Office Action and Search Report dated Mar. 13, 2017 in corresponding Chinese Application No. 201480003451.9 with Partial English Translation of Office Action and Full English Translation of Search Report.

* cited by examiner (A)

(B)

(C)

(D)

US 11,005,119 B2

ELECTROLYTE MEMBRANE FOR FUEL CELL, MANUFACTURING METHOD OF ELECTROLYTE MEMBRANE, MEMBRANE ELECTRODE ASSEMBLY, AND FUEL CELL

TECHNICAL FIELD

The present disclosure relates to a fuel cell (particularly, to a solid-state polymer-type fuel cell), and particularly to an electrolyte membrane included in the fuel cell, a manufacturing method of the electrolyte membrane, and a membrane electrode assembly.

BACKGROUND ART

A fuel cell (especially, a solid-state polymer-type fuel cell) is an apparatus that simultaneously generates electric power and heat by electrochemically reacting a hydrogen-containing fuel gas and an oxygen-containing oxidant gas such as, for example, air.

The fuel cell is generally configured by stacking plural cells (single cells) on each other and press-fastening the stacked plural cells with a fastening member such as a bolt. Each one of the cells is configured by sandwiching a membrane electrode assembly (MEA) using a pair of plate-like electrically conductive separators therebetween.

The MEA includes an electrolyte membrane and a pair of electrodes formed on both faces of the electrolyte membrane. One of the pair of electrodes is an anode electrode and the other thereof is a cathode electrode. Each of the electrodes includes a catalyst layer formed on the surface of the electrolyte membrane, and a gas diffusion layer formed on the catalyst layer.

Such a thin film is used as the electrolyte membrane, as a perfluorosulphonic acid polymer that is a fluorine-based electrolyte resin (an ion exchanger resin). A stretched porous membrane formed by stretching, for example, PTFE or a polyolefin resin is used being buried in the electrolyte resin as a reinforcing body because any sufficient mechanical property cannot be acquired with a thin film of the electrolyte resin alone (see, e.g., Patent Document 1).

The configuration of the electrolyte membrane for a fuel cell of Patent Document 1 is depicted in FIG. 8. As depicted in FIG. 8, an electrolyte membrane 50 includes an electrolyte resin 51 and a reinforcing body 52 buried in the electrolyte resin 51. A stretched porous membrane is used as the reinforcing body 52, and the reinforcing body 52 is disposed in the electrolyte membrane 50 at a substantial center in the thickness direction thereof. For the electrolyte membrane of Patent Document 1, it has been proposed that the electric power generation property is improved by adjusting the position of the reinforcing body 52 in the thickness direction of the electrolyte membrane 50.

A manufacturing method of the traditional electrolyte membrane 50 will be described with reference to FIG. 9. The reinforcing body (the stretched porous membrane) 52 is prepared that is formed on a sheet-like base material 53 ((A) of FIG. 9). An electrolyte solution 51a is applied to the reinforcing body 52 for the overall reinforcing body 52 to be immersed therein, to impregnate the reinforcing body 52 with the electrolyte solution 51a. Thereafter, the electrolyte solution 51a is dried to be the electrolyte resin 51 to establish the state where the reinforcing body 52 is buried in the electrolyte resin 51 ((B) of FIG. 9). The base material 53 is peeled off ((C) of FIG. 9) and the electrolyte solution 51a is further applied to the reinforcing body 52 from the face that is left after the peeling off. Thereafter, the newly applied electrolyte solution 51a is dried to form the electrolyte resin 51, and the electrolyte membrane 50 is manufactured that has the reinforcing body 52 disposed in the electrolyte resin 51 at the substantial center in the thickness direction thereof ((D) of FIG. 9).

It has also been proposed that the mechanical property and the proton conduction property of the membrane are improved by disposing a reinforcing material formed by a paste including conductive nanofibers, on the surface of an electrolyte membrane (see, e.g., Patent Document 2).

PATENT DOCUMENTS

Patent Document 1: JP 2009-16074 A
Patent Document 2: JP 2006-252967 A

SUMMARY OF THE INVENTION

Problems to be Solved by the Invention

The prevalence of fuel cells has recently been increasingly advanced, and providing as inexpensively as possible a fuel cell is demanded that is capable of stably generating electric power with high electric power generation performance. It is therefore required that the electrolyte membrane has a mechanical property that can secure the durability of the membrane, has an excellent electric power generation property, and has an excellent productivity.

With the configuration having the reinforcing body (the stretched porous membrane) 52 buried in the electrolyte resin 51 at the substantial center in the thickness direction thereof, like the electrolyte membrane 50 of Patent Document 1, however, the process steps from the applying process of the electrolyte solution 51a to the drying process need to each be executed twice during the manufacturing process of the electrolyte membrane 50. The applying process and the drying processes of the electrolyte solution 51a need to be executed for each of both faces of the reinforcing body 52. A problem therefore arises that the productivity of the electrolyte membrane is difficult to be improved even when the requirements can be satisfied for the mechanical property and the electric power generation property.

With the electrolyte membrane of Patent Document 2, the reinforcing material is disposed only on the surface of the membrane and it cannot be stated that the mechanical property is sufficiently improved compared to the configuration to have the reinforcing body disposed being brought into the inside of the electrolyte membrane. Many manufacturing process steps are necessary such as screen printing using the paste and a coating process for the reinforcing material, and a problem therefore arises that the productivity of the electrolyte membrane is difficult to be improved.

An object of the present disclosure is to solve the above-described conventional problems and to provide an electrolyte membrane for a fuel cell, a manufacturing method of the electrolyte membrane, a membrane electrode assembly, and a fuel cell with which an electric power generation property and the productivity are enhanced.

Means for Solving Problem

In accomplishing the above objective, an electrolyte membrane for a fuel cell according to one aspect of the present disclosure, comprises an electrolyte resin and a nanofiber unwoven cloth buried in the electrolyte resin, wherein the nanofiber unwoven cloth is exposed only from a first face on which an anode electrode of the electrolyte membrane is disposed.

A membrane electrode assembly for a fuel cell according to one aspect of the present disclosure, comprises an electrolyte membrane including an electrolyte resin and a nanofiber unwoven cloth buried in the electrolyte resin, wherein the nanofiber unwoven cloth is exposed only from a first face on which an anode electrode of the electrolyte membrane is disposed, and wherein the anode electrode is disposed on the first face and the cathode electrode is disposed on the second face of the electrolyte membrane.

A fuel cell according to one aspect of the present disclosure, comprises a membrane electrode assembly having an anode electrode disposed on a first face of and having a cathode electrode disposed on a second face of an electrolyte membrane, wherein the nanofiber unwoven cloth is exposed only from a first face on which an anode electrode of the electrolyte membrane is disposed.

A manufacturing method of an electrolyte membrane for a fuel cell according to one aspect of the present disclosure, comprises: impregnating nanofiber unwoven cloth with an electrolyte solution by applying the electrolyte solution to the nanofiber unwoven cloth formed on a sheet-like base material such that the nanofiber unwoven cloth is buried in the electrolyte solution; drying the electrolyte solution to form an electrolyte resin to form an electrolyte membrane having the nanofiber unwoven cloth buried in the electrolyte resin; and thereafter, peeling off the base material from the electrolyte membrane thereby exposing the nanofiber unwoven cloth only from a first face of the electrolyte membrane, the first face being a face from which the base material is peeled off, and an anode electrode being disposed on the first face.

Effect of the Invention

According to the present disclosure, the electrolyte membrane for a fuel cell, a manufacturing method of the electrolyte membrane, a membrane electrode assembly, and a fuel cell can be provided with which an electric power generation property and the productivity are enhanced.

EMBODIMENTS FOR CARRYING OUT THE INVENTION

Figure 1:
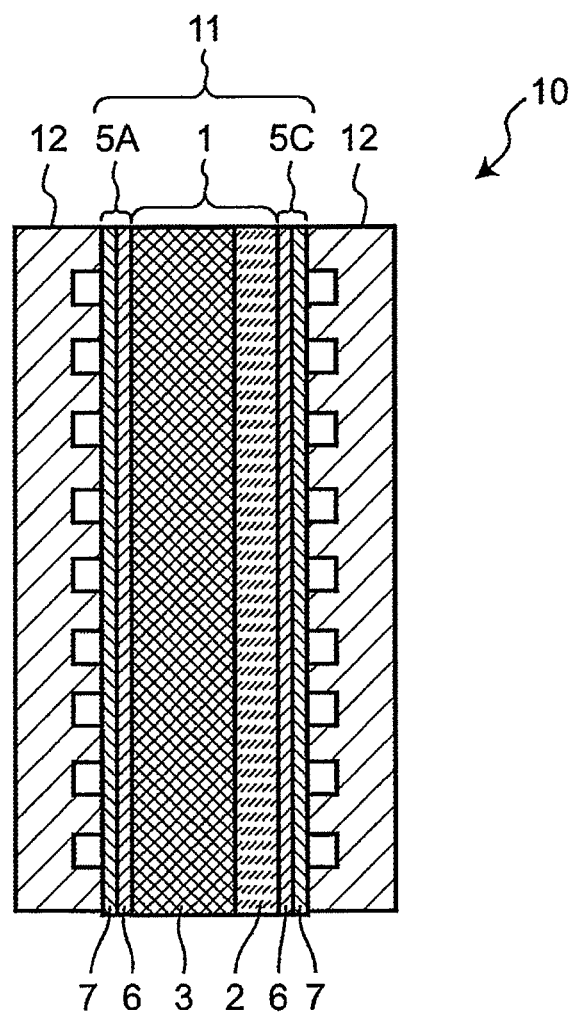
FIG. 1 is a configuration diagram of a fuel cell according to an embodiment of the present disclosure.

According to the first aspect of the present disclosure, there is provided an electrolyte membrane for a fuel cell, comprising an electrolyte resin and a nanofiber unwoven cloth buried in the electrolyte resin, wherein the nanofiber unwoven cloth is exposed only from a first face on which an anode electrode of the electrolyte membrane is disposed.

According to the second aspect of the present disclosure, there is provided the electrolyte membrane according to the first aspect, wherein the nanofiber unwoven cloth has a proton conduction property.

According to the third aspect of the present disclosure, there is provided the electrolyte membrane according to the second aspect, wherein the nanofiber unwoven cloth is disposed in the substantially overall electrolyte membrane in a thickness direction of the electrolyte membrane, and a cathode electrode of the electrolyte membrane is disposed on a second face, and the second face of the electrolyte membrane is covered with the electrolyte resin so as to avoid any exposure of the nanofiber unwoven cloth from the second face.

According to the fourth aspect of the present disclosure, there is provided the electrolyte membrane according to the third aspect, wherein the nanofiber unwoven cloth is positioned at an inner position of the electrolyte resin at a length equal to or greater than 1 μm from the second face of the electrolyte membrane.

According to the fifth aspect of the present disclosure, there is provided the electrolyte membrane according to anyone of the first to fourth aspects, wherein a void rate of the nanofiber unwoven cloth is equal to or higher than 75%.

According to the sixth aspect of the present disclosure, there is provided the electrolyte membrane according to the first or second aspect, wherein a thickness of the nanofiber unwoven cloth is equal to or higher than 30% of a thickness of the electrolyte membrane.

According to the seventh aspect of the present disclosure, there is provided the electrolyte membrane according to the first or second, wherein a thickness of the nanofiber unwoven cloth is equal to or higher than 60% of a thickness of the electrolyte membrane.

According to the eighth aspect of the present disclosure, there is provided the electrolyte membrane according to anyone of the first to fourth aspects, wherein a fiber diameter of nanofiber constituting the nanofiber unwoven cloth is equal to or smaller than 500 nm.

According to the ninth aspect of the present disclosure, there is provided a membrane electrode assembly for a fuel cell, wherein the anode electrode is disposed on the first face and the cathode electrode is disposed on the second face of the electrolyte membrane of anyone of the first to fourth aspects.

According to the tenth aspect of the present disclosure, there is provided a fuel cell comprising: a membrane electrode assembly having the anode electrode disposed on the first face of and having the cathode electrode disposed on the second face of the electrolyte membrane of any one of the first to fourth aspects.

According to the eleventh aspect of the present disclosure, there is provided a manufacturing method of an electrolyte membrane for a fuel cell, comprising: impregnating nanofiber unwoven cloth with an electrolyte solution by applying the electrolyte solution to the nanofiber unwoven cloth formed on a sheet-like base material such that the nanofiber unwoven cloth is buried in the electrolyte solution; drying the electrolyte solution to form an electrolyte resin to form an electrolyte membrane having the nanofiber unwoven cloth buried in the electrolyte resin; and thereafter, peeling off the base material from the electrolyte membrane thereby exposing the nanofiber unwoven cloth only from a first face of the electrolyte membrane, the first face being a face from which the base material is peeled off, and an anode electrode being disposed on the first face.

Embodiments of the present disclosure are described hereinafter with reference to the drawings, but the present disclosure is not limited by the embodiments.

(Embodiment)

A schematic configuration of a fuel cell according to one embodiment of this disclosure will be described with reference to FIG. 1.

The fuel cell according to the present embodiment is a solid-state polymer-type fuel cell that simultaneously generates electric power and heat by electrochemically reacting a hydrogen-containing fuel gas and an oxygen-containing oxidant gas such as, for example, air.

The fuel cell is generally configured by stacking plural cells (single cells) on each other and press-fastening the stacked plural cells with a fastening member such as a bolt. FIG. 1 depicts a cross section of each one cell (hereinafter, referred to simply as "fuel cell") 10 of this fuel cell. As depicted in FIG. 1, the fuel cell 10 (that is, the one cell of the fuel cell) is configured by sandwiching a membrane electrode assembly (MEA) 11 using a pair of plate-like electrically conductive separators 12 therebetween.

The fuel cell includes various incidental apparatuses to execute the electric power generation such as an apparatus supplying the fuel gas, an apparatus supplying the oxidizer gas, an apparatus taking out the generated electricity, and an apparatus removing the heat generated in the electric power generation. Apparatuses of known various aspects can be employed as these incidental apparatuses and these apparatuses will not be described.

As depicted in FIG. 1, the MEA 11 includes an electrolyte membrane 1 and a pair of electrodes formed on both faces of the electrolyte membrane 1. One of the pair of electrodes is an anode electrode 5A and the other thereof is a cathode electrode 5C. Each of the electrodes 5A and 5C includes a catalyst layer 6 formed on the surface of the electrolyte membrane 1, and a gas diffusion layer 7 formed on the catalyst layer 6.

A thin film is used as the electrolyte membrane 1, of a perfluorosulphonic acid polymer that is a fluorine-based electrolyte resin (a proton conductive ion exchanger resin). A reinforcing body 3 capable of providing a mechanical property to the thin film is buried in an electrolyte resin 2 because any sufficient mechanical property cannot be acquired with the thin film of the electrolyte resin alone. The mechanical property can be, for example, variation of the dimension of the electrolyte membrane 1 between dried state and wet state of the electrolyte membrane 1, that is, a swelling ratio. It is demanded that breakage suppression and durability improvement of the electrolyte membrane 1 are facilitated by reducing the swelling ratio.

A catalyst layer 6 includes a catalyst, a catalyst carrier, and an electrolyte. The catalyst produces protons from the fuel gas and causes the protons and the oxidizer gas to bond with each other. For example, a platinum alloy including platinum as its main component is usable as the catalyst. The catalyst carrier is electrically conductive and extracts the electricity generated by the electric power generation reaction from the catalyst to an external circuit. For example, a carbon carrier is usable as the catalyst carrier. The electrolyte propagates the protons produced from the fuel gas. For example, "Aquivion (a registered trademark)" manufactured by Solvay Solexis Inc., is usable as the electrolyte. A porous structure is employed in the catalyst layer 6 because the catalyst dispersed in the catalyst layer 6 causes the fuel gas and the oxidizer gas to react with each other.

The gas diffusion layer 7 is used whose base material is generally formed using carbon fiber. For example, carbon unwoven cloth is usable as this base material.

The separator 12 only has to be formed by a gas-impermeable and electrically conductive material and, for example, separators each formed by cutting a resin impregnated carbon material into a predetermined shape or separators each formed by molding a mixture of carbon powder and a resin material are generally used. A squared U-shaped groove portion is formed in a portion in contact with the MEA 11 of each of the separators 12. The groove portion of the one separator 12 of the pair of separators 12 is brought into contact with the gas diffusion layer 7 and, thereby, a fuel gas flowing path is formed to supply the fuel gas to the electrode face of the anode electrode 5A and carry away the excessive gas. The groove portion of the other separator 12 is brought into contact with the gas diffusion layer 7 and, thereby, an oxidizer gas flowing path is formed to supply the oxidizer gas to the electrode face of the cathode electrode 5C and carry away the excessive gas.

The configuration of the electrolyte membrane 1 included in the MEA 11 of the fuel cell 10 will be described with reference to FIG. 2.

Figure 2:
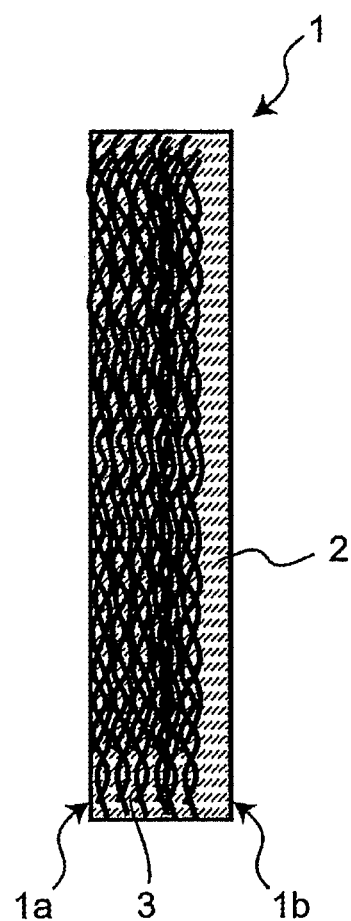
FIG. 2 is a configuration diagram of an electrolyte membrane included in the fuel cell of FIG. 1.

As depicted in FIG. 2, the electrolyte membrane 1 has the reinforcing body 3 buried in the electrolyte resin 2 to improve its mechanical property. Nanofiber unwoven cloth is used as the reinforcing body 3. Hereinafter, the description will be made referring to the reinforcing body 3 as the nanofiber unwoven cloth 3. The nanofiber unwoven cloth 3 includes fiber of, for example, a polyvinylidene fluoride polymer (hereinafter, referred to as "PVDF"). In addition to PVDF, polyvinyl fluoride polymer (hereinafter, referred to as "PVF"), a copolymer including plural monomer units each constituting a polymer such as PVDF or PVF, or a mixture of these polymers may be used as the material of the nanofiber unwoven cloth 3. Preferably, the nanofiber unwoven cloth 3 is formed using a material having a proton non-conduction property such as PVDF.

As depicted in FIG. 2, in the electrolyte membrane 1, the nanofiber unwoven cloth 3 is covered with the electrolyte resin 2 to be exposed only from a face 1a (a first face) on an anode electrode side of the electrolyte membrane 1 and not to be exposed from a face 1b (a second face) on a cathode electrode side.

In an electrolyte membrane 1, the substantially overall nanofiber unwoven cloth 3 is substantially buried in the electrolyte resin 2 while a portion of the nanofibers constituting the nanofiber unwoven cloth 3 is exposed from the electrolyte resin 2 in the face 1a on the anode electrode side of the electrolyte membrane 1.

In contrast, the nanofibers constituting the nanofiber unwoven cloth 3 is covered with the electrolyte resin 2 without being exposed therefrom in the face 1b on the cathode electrode side of the electrolyte membrane 1.

Each piece of the nanofibers constituting the nanofiber unwoven cloth 3 has a fiber diameter in order of "nm" (that is, smaller than 1 um). When the nanofiber unwoven cloth 3 is buried in the electrolyte resin 2, voids formed among the pieces of the nanofibers are also filled with the electrolyte resin 2.

The reinforcing body of the nanofiber unwoven cloth 3 is characterized in that a higher void rate can be acquired than that with any reinforcing body including a stretched porous membrane. It can be stated that the nanofiber of the nanofiber unwoven cloth 3 has a sufficiently small fiber diameter compared to a width dimension of the membrane portion around each pore defining the pore in the stretched porous membrane.

The nanofiber having a small fiber diameter can be deposited at a low density when the nanofiber unwoven cloth 3 is produced using, for example, an electric field spinning method (electro spinning). The nanofiber unwoven cloth can therefore be produced whose void rate is high and whose fiber diameter is small. On the other hand, the stretched porous membrane is produced by pulling the membrane in lateral and longitudinal directions to cause the membrane to be stretched. To increase the porosity (the void rate) or to reduce the width dimension of the membrane portion around each pore defining the pore, a predetermined thickness needs to be established by significantly stretching a sufficiently thick membrane in the lateral and the longitudinal directions. The equipment to produce the stretched porous membrane becomes huge and the control of the thickness is difficult. It can therefore be stated that it is difficult to increase the void rate and reduce the width dimension of the membrane portion around each pore defining the pore for the stretched porous membrane.

The electrolyte resin 2 filling the voids of the nanofiber unwoven cloth 3 is also exposed in the face 1a on the anode electrode side in which the nanofiber unwoven cloth 3 is exposed of the electrolyte membrane 1. Especially, for the nanofiber unwoven cloth 3, the surface area of the electrolyte resin 2 exposed in the face 1a on the anode electrode side of the electrolyte membrane 1 is increased as the fiber diameter is smaller or as the void rate is higher of the nanofiber unwoven cloth 3.

The hydrogen in the fuel gas is ionized by the catalyst layer 6 and the protons are captured in the electrolyte resin 2 on the face 1a on the anode electrode side of the electrolyte membrane 1 while the capturing of the protons is not significantly suppressed because the electrolyte membrane 2 is exposed with a sufficient surface area.

At this time, water (water molecules) in the fuel gas is captured into the electrolyte resin 2 together with the protons, and the protons together with the water move in the electrolyte resin 2 from the anode electrode side to the cathode electrode side (proton conduction). Because the fiber diameter of the nanofiber unwoven cloth 3 is small, slip flows of protons and water are generated on the surface of the nanofiber. The proton conduction in the electrolyte resin 2 tends therefore not to be blocked by the nanofiber unwoven cloth 3 even when the nanofiber unwoven cloth 3 is formed by a material that has the proton non-conduction property. Because the nanofiber unwoven cloth 3 has the high void rate, the voids are filled with the amount of electrolyte resin 2 that is sufficient for the protons to be conducted.

Because the nanofiber unwoven cloth 3 has the high void rate and the fiber diameter of the nanofiber is small in this electrolyte membrane 1 as above, the proton conduction tends not to be blocked even when the nanofiber unwoven cloth 3 is buried in the electrolyte membrane 1 being exposed from the face 1a on the anode electrode side.

In the MEA 11, the reaction taking place at the cathode electrode 5C (that is, the reaction to couple the protons and the oxidizer gas with each other) has a reaction velocity that is slower than that of the reaction taking place at the anode electrode 5A (that is, the reaction to take out the protons from the fuel gas). Preferably, on the face 1b on the cathode electrode side of the electrolyte membrane 1, the nanofiber unwoven cloth 3 is not exposed and is covered with the electrolyte resin 2, and the surface area of the electrolyte resin 2 exposed in the face 1b on the cathode electrode side is maintained to be large. The surface of the nanofiber unwoven cloth 3 can be covered with the electrolyte resin 2 and the nanofiber unwoven cloth 3 can be prevented from being exposed from the face 1b on the cathode electrode side of the electrolyte membrane 1 by positioning the nanofiber unwoven cloth 3 on the inner side of the electrolyte resin 2 by at least 1 µm or more than the face 1b on the cathode electrode side of the electrolyte membrane 1.

A method of manufacturing the electrolyte membrane 1 of this embodiment having the above configuration will be described with reference to explanatory diagrams of (A) to (C) of FIG. 3.

Figure 3:
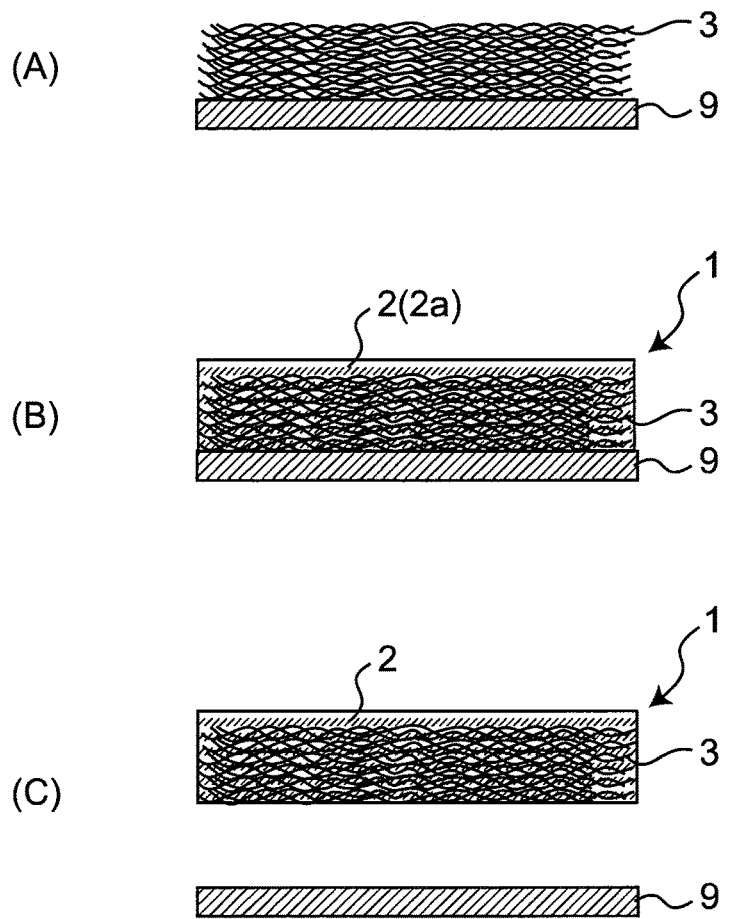
FIG. 3 is an explanatory diagram of a manufacturing method of the electrolyte membrane of FIG. 2.

As depicted in (A) of FIG. 3, the nanofiber unwoven cloth 3 to be used as the reinforcing body is prepared. The nanofiber unwoven cloth 3 is formed by depositing nanofiber on a sheet-like base material 9 by applying the nanofiber thereto using, for example, the electric field spinning method. In the portion for the nanofiber unwoven cloth 3 and the base material 9 to be in contact with each other, therefore, the nanofiber is in contact with the surface of the base material 9 to be able to be peeled off therefrom. Preferably, to form the unwoven cloth with the PVDF using the electro spinning method, PVDF is solved to be a solution using dimethylacetamide as the solvent. Dimethyl sulfoxide, dimethylformamide, acetone, etc., may also be used as the solvent. Preferably, the molecular weight of the material of the nanofiber unwoven cloth 3 is 150,000 to 550,000. When the molecular weight of the material of the nanofiber unwoven cloth 3 is excessively low, the mechanical strength is degraded. On the other hand, when the molecular weight of the material of the nanofiber unwoven cloth 3 is excessively high, the solubility thereof is degraded and the solution of the material is difficult to form.

An electrolyte solution 2a is applied to the nanofiber unwoven cloth 3 on the base material 9. For example, the nanofiber unwoven cloth 3 is impregnated with the electrolyte solution 2a by applying the electrolyte solution 2a thereto such that the overall nanofiber unwoven cloth 3 is buried in the electrolyte solution 2a.

Thereafter, as depicted in (B) of FIG. 3, the electrolyte solution 2a is dried to be the electrolyte resin 2, and the electrolyte membrane 1 is formed that has the nanofiber unwoven cloth 3 buried in the electrolyte resin 2.

Thereafter, as depicted in (C) of FIG. 3, the base material 9 is peeled off from the electrolyte membrane 1. On the face 1a of the electrolyte membrane 1 from which the base material 9 is peeled off, the nanofiber is exposed from the electrolyte resin 2 because the electrolyte solution 2a does not thrust into the portion for the surface of the base material 9 and the nanofiber to be in contact with each other. In contrast, on the face 1b opposite to the face 1a from which the base material 9 is peeled off, the nanofiber unwoven cloth 3 is covered with the electrolyte resin 2 without being exposed therefrom. In this manner, the electrolyte membrane 1 of this embodiment is manufactured. In addition to the above process steps, an annealing process (crystallization process) for the electrolyte membrane may be executed.

In this case, the annealing process is executable regardless of whether the annealing process is executed before or after the peeling off of the electrolyte membrane 1 from the base material 9.

According to the manufacturing method of the electrolyte membrane 1, the application process of the electrolyte solution 2a for the nanofiber unwoven cloth 3 and the drying process executed thereafter can be set to be executed only from the one side (a single-side process). The number of process steps can be reduced and the productivity can be improved compared to the case where the application process and the drying process are executed for the reinforcing body from both sides thereof like the conventional case (a double-side process).

The realization of the single-side process as above enables the reduction of number of the application process steps of the electrolyte solution 2a for the nanofiber unwoven cloth 3, and reduction of the thickness of the electrolyte membrane 1 itself compared to that of the configuration of the double-side process. The proton conduction property in the electrolyte membrane is therefore improved and this can improve the electric power generation performance (reduce the resistance overvoltage), and the amount of the expensive electrolyte solution can be reduced and a cost reduction effect can be achieved.

For example, when the fuel cell of this embodiment is used as an on-vehicle fuel cell, it is effective that the proton conduction property is improved in the electrolyte membrane, because the fuel cell needs to handle a high current (a large proton conduction amount). Reduction of the cost by the reduction of the amount of electrolyte solution to be used is also effective because the number of used electrolyte membranes is also great in the on-vehicle fuel cell.

EXAMPLES

Examples of the electrolyte membrane of this embodiment will be described with reference to measurement results of plural Measurement Examples.

(Fiber Diameter of Nanofiber Unwoven Cloth)

Electrolyte membranes were formed whose nanofiber unwoven cloth was exposed only from each one face, using five types of nanofiber unwoven cloth whose fiber diameters were different from each other (Measurement Examples 1 to 5), and their electric power generation properties were measured.

For the fiber diameter, plural fiber diameters of the nanofiber were measured by observing the nanofiber unwoven cloth using an SEM (Scanning Electron Microscope), and their average value was used.

A membrane electrode assembly (MEA) was manufactured by forming electrodes on the electrolyte membrane that had the nanofiber unwoven cloth buried therein, and the MEA was sandwiched by a pair of separators therebetween to form the fuel cell. The electric power generation property of the fuel cell was measured. The measurement conditions for the electric power generation property were set as follows.

Temperature of Fuel cell: 80° C.
Fuel Gas: Dew Point: 65° C., Fuel Use Rate Uf: 75%
Oxidizer Gas: Dew Point: 65° C., Oxygen Use Rate Uo: 55%
Current Density: 0.24 A/cm$^2$
Effective Electrode Area: 36 cm$^2$
Number of MEA Stacked Layers: One For example, maintaining the temperature of the fuel cell at 65° C., a mixed gas including a hydrogen gas and carbon dioxide (the hydrogen gas to be 75% and carbon dioxide to be 25%) was supplied as the fuel gas in a fuel gas flowing path on the anode side, and air was supplied as the oxidizer gas in the oxidizer gas flowing path on the cathode side. The hydrogen gas use rate (the fuel use rate) was set to be 75% and the oxygen use rate was set to be 55%. The fuel gas and the oxidizer gas were each humidified for the dew points of both gases to be 65° C. and, thereafter, were supplied to the fuel cell.

Aging (an activation process) was executed for the fuel cell by causing the fuel cell to generate electric power for 12 hours at a current density of 0.2 A/cm$^2$. Thereafter, the current density of the fuel cell was set to be zero A/cm$^2$ and, still continuously maintaining the gas flow and the dew point on the cathode side, the gas was switched from air to nitrogen and this state was maintained for 30 min to execute a recovery process. Thereafter, the gas on the cathode side was again switched to air and, thereafter (the oxygen use rate was 55% and the dew point was 65° C.), the electric power generation was caused to start at a current density of 0.24 A/cm$^2$ and the temperature of the fuel cell was changed to 80° C. The electric power generation voltage for four hours was measured from the time when the temperature of the fuel cell reached 80° C. The measurement results were as follows.

| | Fiber Diameter | Electric Power Generation Property |
|---|---|---|
| Measurement Example 1: | 192 nm | −4.3 mV |
| Measurement Example 2: | 326 nm | −8.0 mV |
| Measurement Example 3: | 425 nm | −8.3 mV |
| Measurement Example 4: | 454 nm | −12.6 mV |
| Measurement Example 5: | 566 nm | −12.8 mV |

Figure 4:
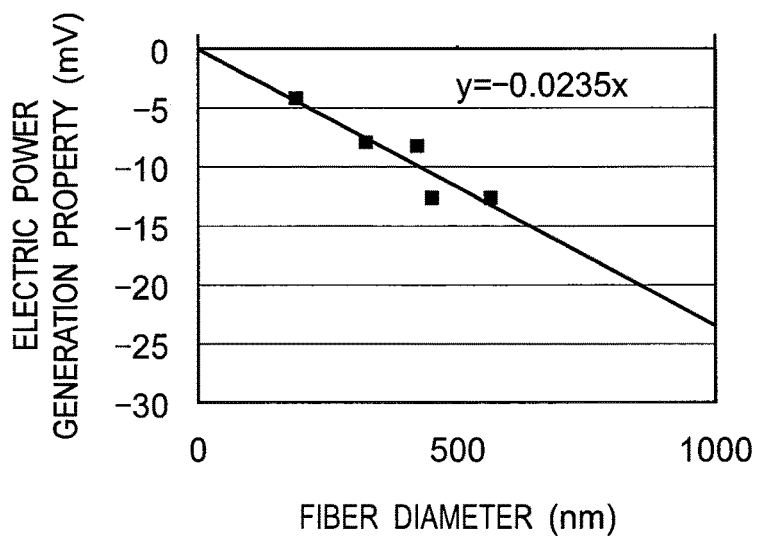
FIG. 4 is a graph of a relation between a fiber diameter of nanofiber unwoven cloth and an electric power generation property.

An approximation equation was derived based on the measurement results of the five measurement examples, and the measurement results and the approximation equation were depicted in a graph of FIG. 4 having therein the axis of abscissa (the x-axis) representing the fiber diameter (nm) and the axis of ordinate (the Y-axis) representing the electric power generation property (mV). The electric power generation property was plotted as the graph using a reference property (zero mV) acquired from the approximation equation for the fiber diameter of the nanofiber unwoven cloth that was zero nm.

As depicted in the graph of FIG. 4, it can be seen that the electric power generation property was degraded by 2.4 mV when the fiber diameter of the nanofiber of the nanofiber unwoven cloth became greater by 100 nm. Preferably, the fiber diameter is set to be at least equal to or smaller than 850 nm because the electric power generation property equal to or higher than −20 mV is necessary taking into consideration the practical electric power generation property. More preferably, the fiber diameter is set to be equal to or smaller than 640 nm to acquire the electric power generation property equal to or higher than −15 mV and, when the fiber diameter is equal to or smaller than 500 nm, a more excellent electric power generation property can be acquired.

(Void Rate of Nanofiber Unwoven Cloth)

Electrolyte membranes were formed whose nanofiber unwoven cloth was exposed only from each one face (the face on the anode electrode side) using five types of nanofiber unwoven cloth whose void rates were different from each other (Measurement Examples 11 to 15), and their electric power generation properties were measured. The measurement conditions and the evaluation method of the electric power generation properties were same as those for the case of "Fiber Diameter of Nanofiber Unwoven Cloth".

|  | Void Rate | Electric Power Generation Property |
|---|---|---|
| Measurement Example 11: | 79% | −9.2 mV |
| Measurement Example 12: | 81% | −6.5 mV |
| Measurement Example 13: | 86% | −5.6 mV |
| Measurement Example 14: | 87% | −5.0 mV |
| Measurement Example 15: | 88% | −4.9 mV |

Figure 5:
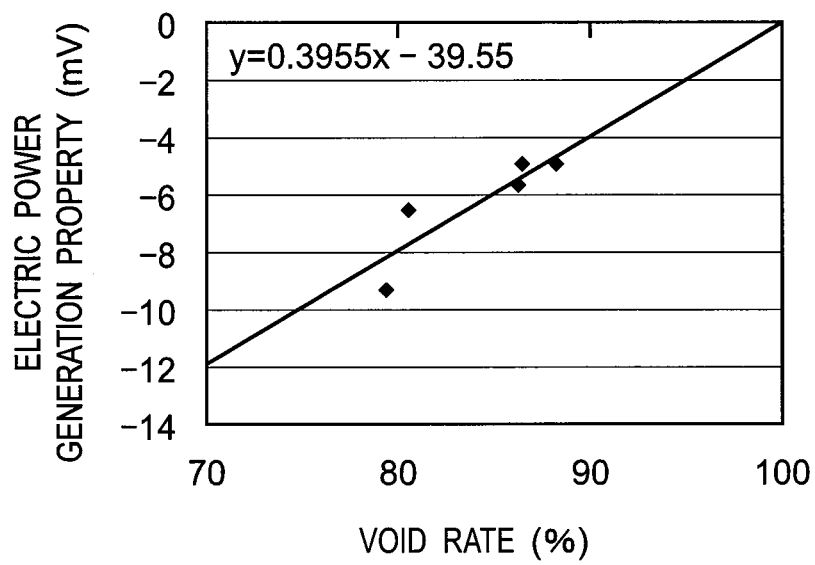
FIG. 5 is a graph of a relation between a void rate of the nanofiber unwoven cloth and the electric power generation property.

An approximation equation was derived based on the measurement results of the five measurement examples, and the measurement results and the approximation equation were depicted in a graph of FIG. 5 having therein the axis of abscissa (the x-axis) representing the void rate (%) and the axis of ordinate (the y-axis) representing the electric power generation property (mV). The electric power generation property was plotted as the graph using a reference property (zero mV) acquired from the approximation equation for the void rate of the nanofiber unwoven cloth that was 100%.

As depicted in the graph of FIG. 5, it can be seen that the electric power generation property was degraded by 4 mV when the void rate of the nanofiber unwoven cloth became smaller by 10%. Preferably, the void rate is set to be at least equal to or greater than 50% because the electric power generation property equal to or higher than −20 mV is necessary taking into consideration the practical electric power generation property. More preferably, the void rate is set to be equal to or higher than 75% to acquire an excellent electric power generation property equal to or higher than −10 mV and, when the void rate is equal to or higher than 80%, a more excellent electric power generation property can be acquired.

The void rate of the nanofiber unwoven cloth in the electrolyte membrane of each of Measurement Examples 11 to 15 was the void rate in the state before the electrolyte solution was impregnated. It can be considered that the void rate of the nanofiber unwoven cloth is increased or reduced when the nanofiber unwoven cloth is buried in the electrolyte resin. From the measurement results, however, it can be seen from the measurement results that a more excellent electric power generation property can be acquired by employing the nanofiber unwoven cloth whose void rate is higher. The upper limit value of the void rate is the void rate with which the nanofiber unwoven cloth is handled substantially without any problem in the course of the manufacture.

(Mechanical Property (Thickness Dimension of Nanofiber Unwoven Cloth/Thickness Dimension of Electrolyte Membrane))

Electrolyte membranes were formed whose nanofiber unwoven cloth was exposed only from each one face using seven types of nanofiber unwoven cloth whose ratios of the thicknesses of the nanofiber unwoven cloth to the thickness dimensions of the electrolyte membrane were different from each other (Measurement Examples 21 to 29), and the mechanical property thereof was measured. The thickness dimension of the nanofiber unwoven cloth and the thickness dimension of the electrolyte membrane were measured by observing the cross section of the electrolyte membrane having the nanofiber unwoven cloth buried therein. In Measurement Example 21 whose thickness ratio of the nanofiber unwoven cloth was 100%, the nanofiber unwoven cloth was exposed from both faces of the electrolyte membrane. A dimension variation ratio (a swelling ratio or an expansion ratio) was measured between the dried electrolyte membrane and the wet electrolyte membrane, as the mechanical property.

The wet electrolyte membrane was the electrolyte membrane that was acquired by immersing the specimen for one hour in a beaker having pure water at 80° C. put therein and the electrolyte membrane was taken out of the water to measure the dimensions of the electrolyte membrane in directions along the surface of the membrane (an X-direction and a Y-direction). For the dried electrolyte membrane, the conditions were set to be 25° C. and the relative humidity of 50% and the dimensions of the electrolyte membrane were measured. The dimension variation ratio was measured in each of the X-direction and the Y-direction and, when an isotropic nature is present for the X- and the Y-directions, the larger value was employed. The electrolyte membranes were used that each were 25 mm×25 mm. The measurement results were as follows.

|  | Nanofiber Unwoven Cloth Thickness Ratio | Dimension Variation Ratio |
|---|---|---|
| Measurement Example 21: | 100% | 2% |
| Measurement Example 22: | 75% | 3% |
| Measurement Example 23: | 75% | 3% |
| Measurement Example 24: | 56% | 4% |
| Measurement Example 25: | 50% | 4% |
| Measurement Example 26: | 38% | 3% |
| Measurement Example 27: | 38% | 5% |
| Measurement Example 28: | 25% | 6% |
| Measurement Example 29: | 19% | 6% |

Figure 6:
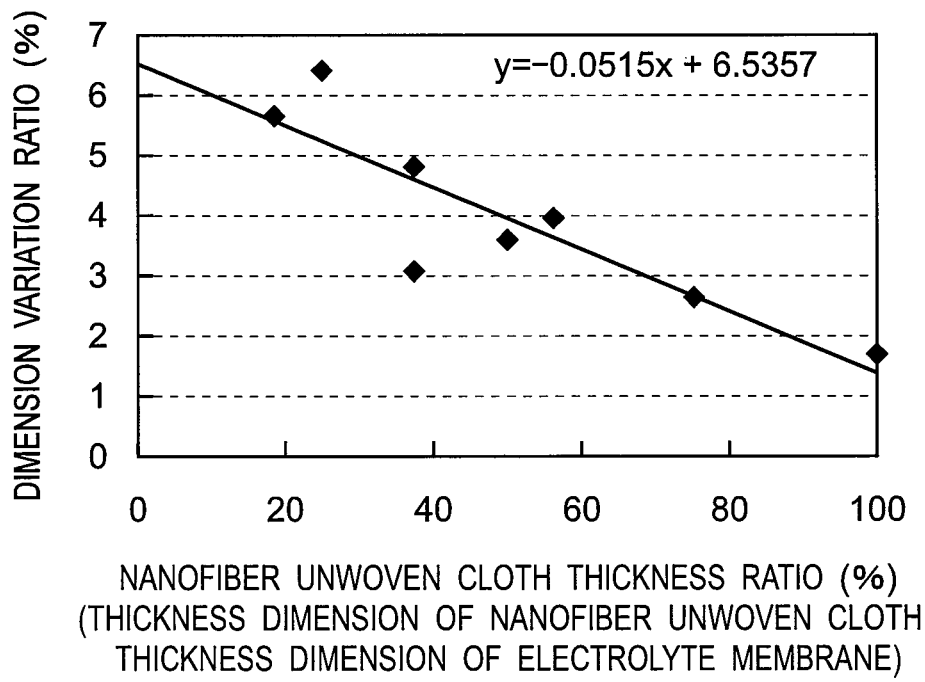
FIG. 6 is a graph of a relation between a thickness ratio of the nanofiber unwoven cloth and a dimension variation ratio.

An approximation equation was derived based on the measurement results of the nine measurement examples, and the measurement results and the approximation equation were depicted in a graph of FIG. 6 having therein the axis of abscissa (the x-axis) representing the nanofiber unwoven cloth thickness ratio (%) and the axis of ordinate (the y-axis) representing the dimension variation ratio (%).

As depicted in the graph of FIG. 6, the dimension variation ratio can be set to be within 6% by setting the thickness ratio of the nanofiber unwoven cloth to be at least equal to or greater than 20%, and the mechanical property can be acquired with which the electrolyte membrane is substantially usable. The dimension variation ratio can be set to be within 5% by setting the thickness ratio of the nanofiber unwoven cloth to be equal to or greater than 30%, and an excellent mechanical property can be acquired. When the thickness ratio of the nanofiber unwoven cloth is set to be equal to or greater than 60%, the dimension variation ratio can be suppressed to be within 3.4% and curling (bending) can be suppressed of the electrolyte membrane having the nanofiber unwoven cloth buried therein. Especially, with the structure having the nanofiber unwoven cloth exposed only from the one face of the electrolyte membrane, the electrolyte membrane tends to be curled while the occurrence of the curling can be suppressed by setting the thickness ratio of the nanofiber unwoven cloth to be equal to or greater than 60%. The handling of the electrolyte membrane can be made excellent in the course of the manufacture and the productivity can be improved.

(Position of Nanofiber Unwoven Cloth in Electrolyte Membrane in Thickness Direction Thereof)

The electric power generation property was measured using four types of electrolyte membrane each having the nanofiber unwoven cloth of the same thickness disposed at a different position in the thickness direction (Measurement Examples 31 to 34). The measurement conditions and the evaluation method of the electric power generation property were same as those for "Fiber Diameter of Nanofiber Unwoven Cloth". The measurement results were as follows and FIG. 7 depicts a graph thereof.

|  | Disposition of Nanofiber Unwoven Cloth | Electric Power Generation Property |
|---|---|---|
| Measurement Example 31: | Inside | 0 mV |
| Measurement Example 32: | Both sides | −25 mV |
| Measurement Example 33: | Anode side | 0 mV |
| Measurement Example 34: | Cathode side | −17 mV |

The nanofiber unwoven cloth was disposed in the central portion (the inside) of the electrolyte membrane in Measurement Example 31, was disposed to be exposed on both of the anode side and the cathode side in Measurement Example 32, and was disposed to be exposed only on the cathode side in Measurement Example 34. The nanofiber unwoven cloth was disposed to be exposed only on the anode side in Measurement Example 33. The electric power generation property was plotted as the graph using a reference property (zero mV) acquired from Measurement Example 31 having the nanofiber unwoven cloth disposed in the central portion (the inside) of the electrolyte membrane.

Figure 7:
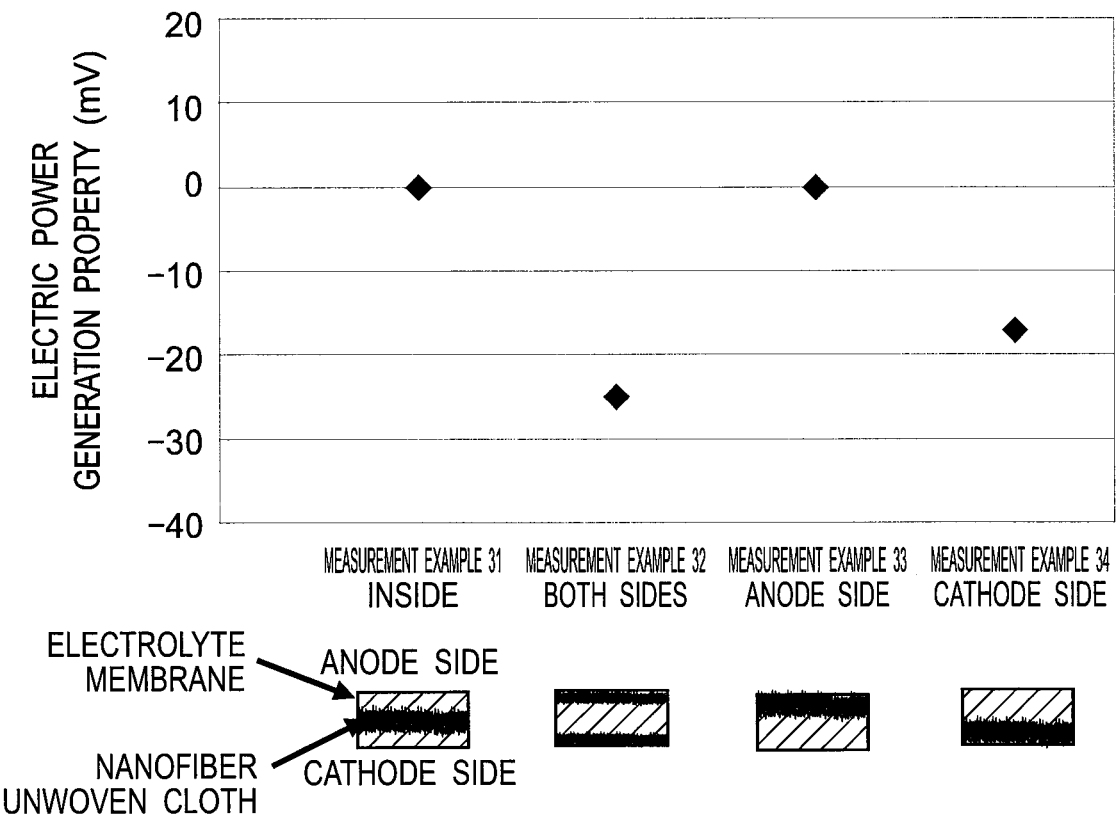
FIG. 7 is a graph of a relation between a position of the nanofiber unwoven cloth in a thickness direction of the electrolyte membrane and the electric power generation property (including a diagram of the position in the electrolyte membrane)
Figure 8:
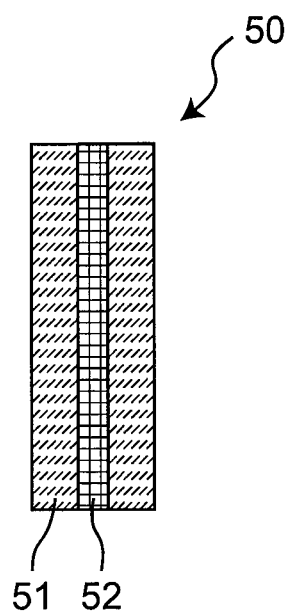
FIG. 8 is a configuration diagram of a conventional electrolyte membrane for a fuel cell.
Figure 9:
FIG. 9 is an explanatory diagram of a manufacturing method of a conventional electrolyte membrane.
Figure 9:
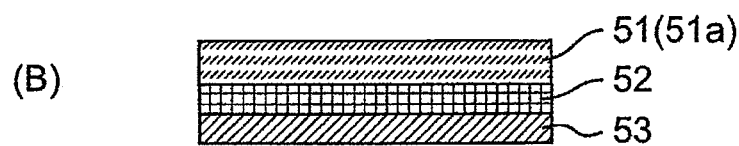
Figure 9:
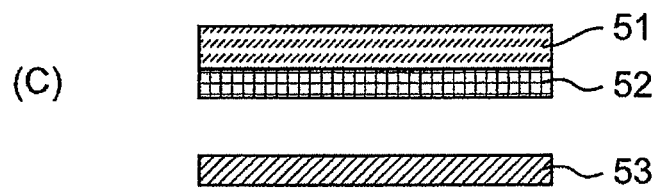
Figure 9:
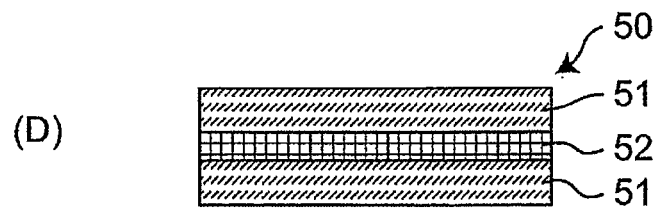

As depicted in FIG. 7, the electric power generation property was low in Measurement Example 32 having the nanofiber unwoven cloth exposed on both sides and Measurement Example 34 having the nanofiber unwoven cloth exposed only on the cathode side. In contrast, an excellent electric power generation property was acquired in each of Measurement Example 31 having the nanofiber unwoven cloth disposed inside and Measurement Example 33 having the nanofiber unwoven cloth exposed only on the anode side. It can especially be seen that the excellent electric power generation property same as that of the form having the nanofiber unwoven cloth disposed in the inside was able to also be acquired with the form having the nanofiber unwoven cloth exposed only on the anode side. The high electric power generation property can therefore be acquired enabling an increase of the productivity.

(Improvement of Electric Power Generation Property by Forming Electrolyte Membrane to be Thin by Single-Side Process)

The electric power generation property was checked using fuel cells (Measurement Examples 41 and 42) each manufactured by forming the electrodes on the electrolyte membrane having the nanofiber unwoven cloth buried therein to manufacture the MEA, and sandwiching the MEA using the pair of separators. The measurement conditions for the electric power generation property were as follows.

Measurement Example 41

Temperature of Fuel cell: 80° C.
Fuel Gas: Dew Point: 56° C.
Oxidizer Gas: Dew Point: 56° C.
Current Density: 1 A/cm$^2$
Effective Electrode Area: 36 cm$^2$
Number of Stacked Layers of MEA: One
Conductivity of Electrolyte Membrane (in Portion Having No Nanofiber Unwoven Cloth Buried Therein): 0.046 S/cm Measurement Example 42

Temperature of Fuel cell: 80° C.
Fuel Gas: Dew Point: 66° C.
Oxidizer Gas: Dew Point: 66° C.
Current Density: 1 A/cm$^2$
Effective Electrode Area: 36 cm$^2$
Number of Stacked Layers of MEA: One
Conductivity of Electrolyte Membrane (in Portion Having No Nanofiber Unwoven Cloth Buried Therein): 0.057 S/cm As to the electrolyte membrane formed by the single-side process, the electrolyte membrane was able to be formed to be thinner by, for example, 5 µm than that formed by the double-side process. With the fuel cell of Measurement Example 41, the resistance overvoltage was therefore reduced by 11 mV and the electric power generation property was improved by 11 mV. With the fuel cell of Measurement Example 42, the resistance overvoltage was reduced by 7 mV and the electric power generation property was improved by 7 mV.

Any combination of the various embodiments referred to above can produce respective effects.

Although the present disclosure has been fully described by way of preferred embodiments with reference to the accompanying drawings, it is to be noted here that various changes and modifications will be apparent to those skilled in the art. Therefore, unless such changes and modifications otherwise depart from the scope of the present disclosure as set forth in the appended claims, they should be construed as being included therein.

INDUSTRIAL APPLICABILITY

The electrolyte membrane for a fuel cell of the present disclosure is the electrolyte membrane having the nanofiber unwoven cloth buried in the electrolyte resin, and has the configuration to have the nanofiber unwoven cloth exposed only from the first face on which the anode electrode is disposed of the electrolyte membrane, and the electric power generation property and the productivity can be improved. The fuel cell capable of generating electric power with an enhanced electric power generation property can therefore be provided as inexpensively as possible by using the electrolyte membrane in the fuel cell.

EXPLANATIONS OF REFERENCE NUMERALS 1 electrolyte membrane
1a face on the anode electrode side (first face)
1b face on the cathode electrode side (second face)
2 electrolyte resin
2a electrolyte solution
3 nanofiber unwoven cloth (reinforcing body)

5A anode electrode
5C cathode electrode
6 catalyst layer
7 gas diffusion layer
9 base material
10 fuel cell
11 membrane electrode assembly
12 separator

The invention claimed is:

1. An electrolyte membrane for a fuel cell, comprising an electrolyte resin and a nanofiber unwoven cloth buried in the electrolyte resin, wherein
the nanofiber unwoven cloth is exposed only from a first face of the electrolyte membrane, and an anode electrode is disposed on the first face of the electrolyte membrane.

2. The electrolyte membrane according to claim 1, wherein the nanofiber unwoven cloth has a proton conduction property.

3. The electrolyte membrane according to claim 2, wherein
a cathode electrode is disposed on a second face of the electrolyte membrane, wherein the second face of the electrolyte membrane is opposite to the first face of the electrolyte membrane, and wherein the nanofiber unwoven cloth is not exposed from the second face of the electrolyte membrane.

4. The electrolyte membrane according to claim 3, wherein the nanofiber unwoven cloth is positioned at an inner position of the electrolyte resin and at least 1 μm from the surface of the second face of the electrolyte membrane.

5. The electrolyte membrane according to claim 1, wherein a void rate of the nanofiber unwoven cloth is equal to or higher than 75%.

6. The electrolyte membrane according to claim 1, wherein a thickness of a buried portion of the nanofiber unwoven cloth is equal to or higher than 30% of a thickness of the electrolyte membrane.

7. The electrolyte membrane according to claim 1, wherein a thickness of a buried portion of the nanofiber unwoven cloth is equal to or higher than 60% of a thickness of the electrolyte membrane.

8. The electrolyte membrane according to claim 1, wherein a fiber diameter of nanofiber constituting the nanofiber unwoven cloth is equal to or smaller than 500 nm.

9. A membrane electrode assembly for a fuel cell, wherein the anode electrode is disposed on the first face and the cathode electrode is disposed on a second face of the electrolyte membrane according to claim 1.

10. A fuel cell comprising:
a membrane electrode assembly having the anode electrode disposed on the first face of and having the cathode electrode disposed on a second face of the electrolyte membrane according to claim 1.

11. A manufacturing method of an electrolyte membrane for a fuel cell, comprising:
impregnating nanofiber unwoven cloth with an electrolyte solution by applying the electrolyte solution to the nanofiber unwoven cloth formed on a base material in a form of sheet such that the nanofiber unwoven cloth is buried in the electrolyte solution;
drying the electrolyte solution to form an electrolyte resin to form an electrolyte membrane having the nanofiber unwoven cloth buried in the electrolyte resin; and
thereafter, peeling off the base material from the electrolyte membrane thereby exposing the nanofiber unwoven cloth only from a first face of the electrolyte membrane, the first face being a face from which the base material is peeled off, and an anode electrode being disposed on the first face.

* * * * *